United States Patent [19]

Ikuta

[11] Patent Number: 5,107,449
[45] Date of Patent: Apr. 21, 1992

[54] DISTANCE MEASURING DEVICE

[75] Inventor: Kiyoshi Ikuta, Kanagawa, Japan

[73] Assignee: Canon Kabushiki Kaisha, Tokyo, Japan

[21] Appl. No.: 723,691

[22] Filed: Jun. 24, 1991

Related U.S. Application Data

[63] Continuation of Ser. No. 625,630, Dec. 6, 1990, abandoned, which is a continuation of Ser. No. 313,746, Feb. 22, 1989, abandoned.

[30] Foreign Application Priority Data

Feb. 27, 1988 [JP] Japan .................... 63-045349

[51] Int. Cl.$^5$ .................... G01B 21/00; H04N 7/18
[52] U.S. Cl. .................... 364/561; 364/579; 356/383; 356/215; 356/4; 250/201.6
[58] Field of Search ............ 364/561, 579; 356/383, 356/384, 215, 356, 4; 250/201.6

[56] References Cited

U.S. PATENT DOCUMENTS

| | | | |
|---|---|---|---|
| 4,175,365 | 11/1979 | Leitz et al. | 250/201.6 X |
| 4,303,981 | 12/1981 | Kondo et al. | 364/561 |
| 4,370,724 | 1/1983 | Herbst et al. | 364/561 |
| 4,522,492 | 6/1985 | Masunaga | 250/201.6 X |
| 4,601,574 | 7/1986 | Yamane et al. | 250/201.6 X |
| 4,755,959 | 7/1988 | Weber et al. | 364/561 |
| 4,864,395 | 9/1989 | Tajima | 364/561 |
| 4,866,782 | 9/1989 | Sugie et al. | 356/384 |
| 4,970,384 | 11/1990 | Kambe et al. | 250/201.6 X |
| 4,976,537 | 11/1990 | Kotani et al. | 250/201.6 X |
| 5,003,166 | 3/1991 | Girod | 250/201.6 X |

*Primary Examiner*—Joseph L. Dixon
*Attorney, Agent, or Firm*—Robin, Blecker, Daley & Driscoll

[57] ABSTRACT

A distance measuring device determines the distance to an object. A position detector detects the position of a signal reflected off an object. The position detector has a plurality of outputs wherein the ratio between the outputs vary in accordance with the position of the reflected signal. The ratio is obtained from the ratio of a period of time required for an ascending integration to a period of time required for a descending integration. A control circuit causes the ascending integration and descending integration to be performed repeatedly a plural number of times and obtains the receiving position from the ratio of the periods of time required for the plural number of times of the ascending integration and the descending integration.

26 Claims, 8 Drawing Sheets

DISTANCE MEASURING DEVICE

This is a continuation application under 37 CFR 1.62 of prior application Ser. No. 625,630, filed Dec. 6, 1990 now abandoned, which is a continuation application under 37 CFR 1.62 of prior application Ser. No. 313,746, filed Feb. 22, 1989 now abandoned.

BACKGROUND OF THE INVENTION

1. Field of the Invention

This invention relates to an improvement in a distance measuring device of the active type arranged in camera and the like, etc.

2. Description of the Related Art

In this kind of device, there have been many previous proposals for measuring a distance to an object on the basis of the principle of triangulation by projecting a light signal onto the object and finding a position at which the light signal reflected from the object is received and which varies depending on the distance to the objects. In these proposals, generally, a light receiving element such as a PSD having two outputs of which the ratio varies according to the receiving position of the reflected light signal is used. By detecting the ratio of the two outputs, the receiving position for the reflected light signal can be detected. To seek the ratio of the two outputs, for example, the two outputs are logarithmically compressed and, then, are subtracted one from the other. Of the systems employing this method, there is the dual slope integration type as disclosed in Japanese Laid-Open Patent Application No. Sho 60-19116 or others. This system has merits such that only one integration circuit suffices contributing to a small circuit scale and that the problem of matching the circuit constants is not encountered since one circuit is used in common to carry out both integrations as they take place time-divisionally. The distance measuring technique utilizing the dual slope integration is briefly explained below.

Figure 8:
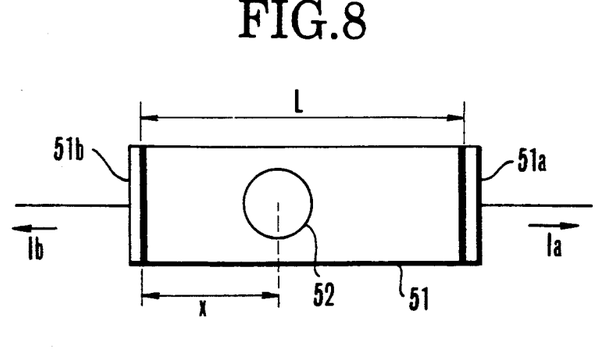
FIG. 8 is a diagram for explaining the PSD which is generally used in the device of this kind.

Referring to FIG. 8, while a light signal is projected onto an object whose distance is to be measured, a position at which the light signal reflected from the object is received is detected by a semiconductor position detector 51 (hereinafter referred to as PSD) having electrodes 51a and 51b at either end. Reference numeral 52 represents a spot light which is formed by the reflection of the light signal projected onto the object. The PSD 51 outputs photocurrents indicative of the position of the center of gravity of the spot light 52 from the respective electrodes 51a and 51b. Now, letting the length of the space between the electrodes 51a and 51b of the PSD 51 be denoted by L, the distance from the electrode 51b to the center of gravity of the spot light 52 by x, and the photocurrents output from the electrodes 51a and 51b by Ia and Ib, respectively, the following equation is obtained:

$$Ia/(Ia+Ib) = x/L \ldots \quad (1)$$

Thus, $Ia/(Ia+Ib)$ is in proportional relation with the relative position x of the center of gravity of the spot light 52. To find the value of $Ia/(Ia+Ib)$ is to find the center of gravity of the spot light 52. Since, as has been described above, the position of the spot light 52 corresponds to the distance to an object to be photographed, the value of $Ia/(Ia+Ib)$ takes a value corresponding to the object distance.

Figure 9:
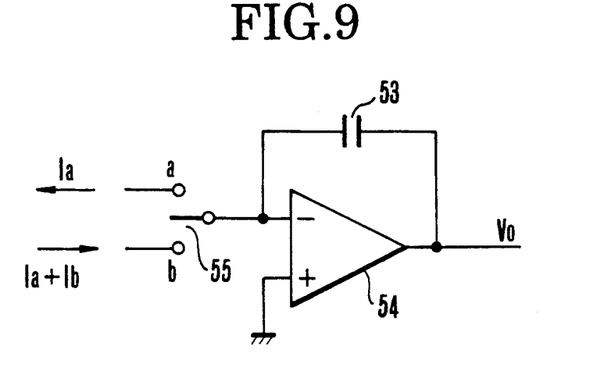
FIG. 9 is a block diagram illustrating the construction of the integration circuit in the same device.
Figure 10:
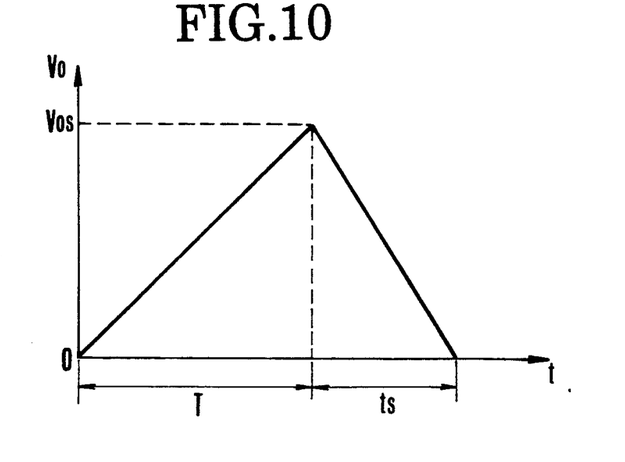
FIG. 10 is a graph for explaining the first and second integrating operations in the same device.

FIG. 9 shows an integrator for performing computation of the equation (1) comprising an integration capacitor 53, an amplifier 54 constituting a Miller integration circuit together with the integration capacitor 53 and a switch 55 for selecting either one of the two outputs of a circuit (not shown) which represent the photocurrent Ia and the reversed photocurrent Ia+Ib. Now, suppose with the integration capacitor 53 having no charge at all, the switch 55 is set in its "a" position to integrate the photocurrent Ia for a period of time T (hereinafter called a "first integration"). Then, the switch 55 is moved to and, set in, its "b" position to integrate the photocurrent (Ia+Ib) in the reverse direction (hereinafter called a "second integration"), wherein it takes a period of time "ts" to return the charge on the integration capacitor 53 to zero. During this process, the output $V_0$ of the amplifier 54 varies as shown in FIG. 10. Here, when the integration capacitor 53 has a capacitance C, as is apparent from FIG. 10, the following equation is established:

$$V_{os} = Ia \cdot T/C = (Ia+Ib)ts/C \ldots \quad (2)$$

By rearranging this, $$ts = (Ia/(Ia+Ib)) \cdot T$$

is obtained.

Since the $Ia/(Ia+Ib)$ corresponds to the position x of the center of gravity of the spot light 52 (see the equation (1)), the following equation is obtained by the equations (1) and (3):

$$ts = (x/L) \cdot T \ldots \quad (4)$$

Thus, the second integration time "ts" has a value corresponding to the position x of the spot light, hence, to the distance to the object.

It should be noted that although the foregoing discussion has been made as if the photocurrents output from the PSD 51 are directly integrated, in actual practice the first integration is preceded by amplification with a number of successive amplifiers. It should also be noted that a light projecting means, for example, an infrared light emitting diode (hereinafter referred to as iRED) is made to be modulated at a frequency of several KHz to several tens of KHz in order to discriminate it from the ambient light. Meanwhile, even in the integrator, it is the general practice that the integration is carried out in synchronism with the frequency of modulation of the iRED.

By the way, the system employing above-described dual slope integration has the following problems.

Firstly, because the integration is time-divisionally performed, the magnitude of the signal, i.e. the strength of the reflected light from the object, in the first integration time must be equal to that of the signal (the strength of the reflected light) in the second integration time, otherwise an error of distance measurement would be produced. In other words, the signal must be constant during the distance measurement. In a case where a projected light spot moves on the object across its parts of different reflectance due to, for example, camera shake, etc., an error of distance measurement would be produced. If the integration time is shortened, this problem can be improved. However, conversely, a deterioration of the S/N ratio will be invited. This is because the use of the synchronous integration makes the ratio of the mu-factor of the frequency component of the signal to the mu-factor of the frequency component of the other, i.e. the S/N ratio, better in proportion to the cubic root of the integration time.

Figure 11:
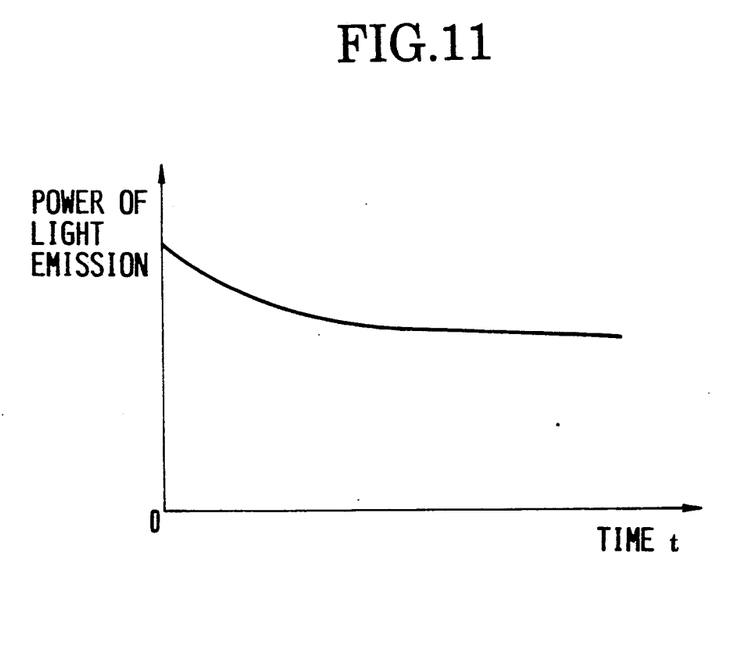
FIG. 11 is a graph illustrating the relationship between the power of light emitted from the iRED and the time in the same device.

Another problem that becomes serious is that the efficiency of light emission lowers as the temperature of the iRED increases during the energization. This is because the flow of electric current through the iRED leads to an increase in its temperature which in turn causes the efficiency of heat generation to lower. Therefore, for even the same current value, the power of light emission after a certain time from the start of energization is different from that at the start time. Hence the signal itself is caused to be ever changing during the integration. This condition is shown in FIG. 11.

SUMMARY OF THE INVENTION

With the foregoing in mind, the present invention has been made, and its object is to provide a distance measuring device for measuring a distance to an object in accordance with a receiving position at which a reflected signal obtained by projecting a signal onto the object is received, in which the ratio between plural outputs of signal receiving means for receiving the reflected signal varies according to the receiving position for the reflected signal, and in which that ratio is obtained from the ratio of periods of time required for an ascending integration and a descending integration on outputs of the signal receiving means to detect the receiving position, the distance measuring device comprising a control circuit for causing the ascending integration and the descending integration to be repeatedly performed a plural number of times and for obtaining the receiving position from the ratio of periods of time required for the ascending integration and the descending integration which have been performed the plural number of times, so that the error due to the variation of the reflected signal during the integration process can be reduced and, by making it possible to elongate the total integration time, the S/N ratio is improved. Thus, the object of the invention is to provide a distance measuring device which is made free from errors of distance measurement and which enables an improvement of the accuracy of distance measurement to be achieved.

Another object of the invention is to provide a distance measuring device having setting means for judging an integration state in an initial stage of the plural number of times of the integrating operation and for setting, based on this judgment, the plural number of times of the integrating operation to an appropriate number of times to thereby make more proper the distance measuring operation.

Still another object of the invention is to provide a distance measuring device having complementing means for cancelling a fraction produced every one integrating operation of the plural number of times of the integrating operation by the next integrating operation, thus making it possible to prevent the error from increasing due to the repetition of the integrating operation by the plural number of times.

Other objects of the invention will become apparent from the following description of embodiments thereof.

DETAILED DESCRIPTION OF THE PREFERRED EMBODIMENTS

The present invention is next described in great detail in connection with embodiments thereof.

Figure 1:
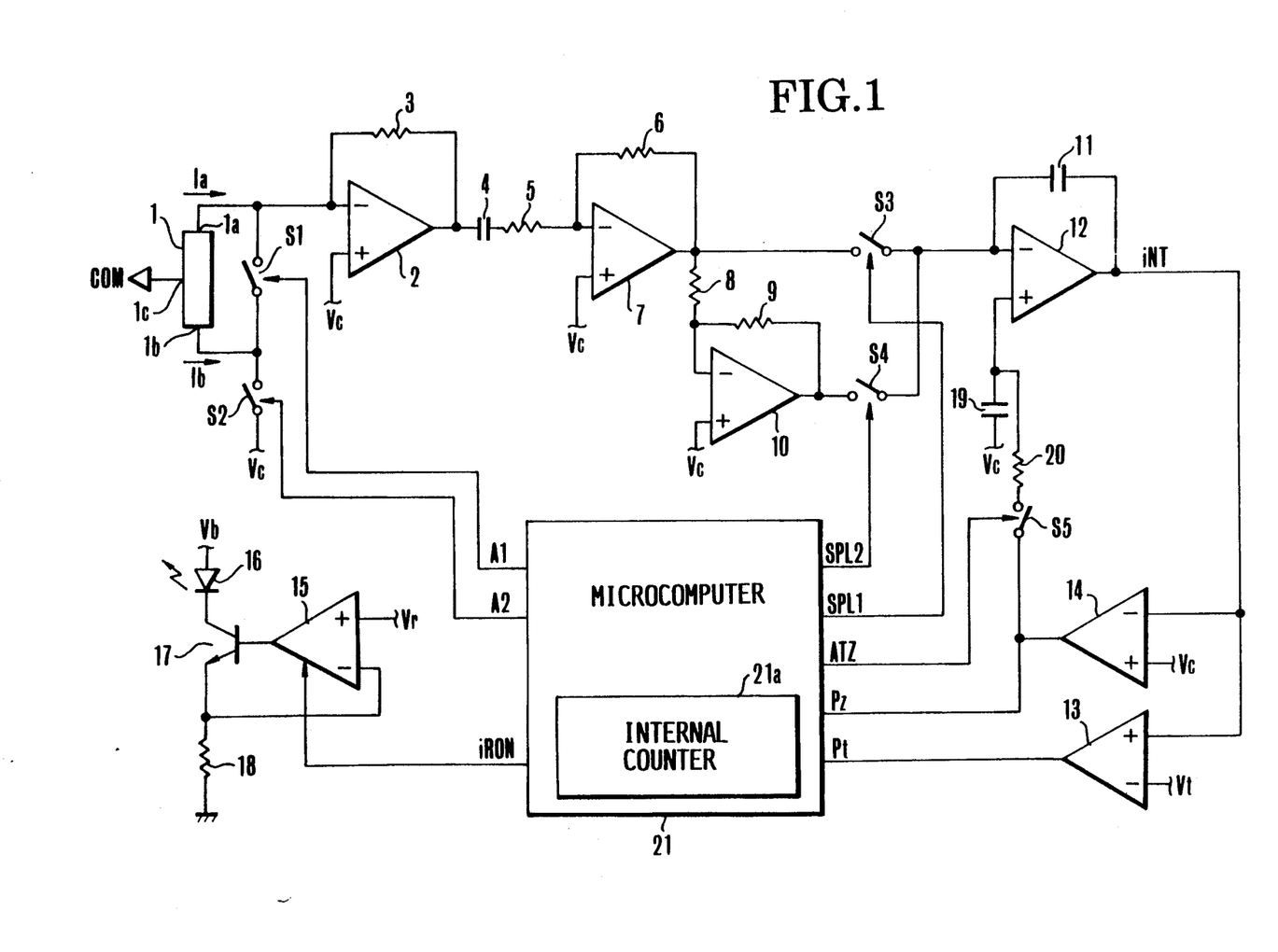
FIG. 1 is an electric circuit diagram, partly in block form, illustrating one embodiment of the invention.

In FIG. 1, there is shown one embodiment of a distance measuring circuit according to the invention applied to the camera, including a PSD 1 having electrodes 51$a$ and 51$b$ from which photocurrents I$a$ and I$b$ corresponding to the position of the center of gravity of a spot light serving as the distance measurement signal are output and having a common electrode to which a voltage COM is applied, an amplifier 2 cooperating with a feedback resistor 3 to convert the photocurrent output from the PSD 1 to a voltage, a coupling capacitor 4, a resistor 5 having a resistance value R5, a resistor 6 having a resistance value R6, an amplifier 7 having a mu-factor of ($-$R6/R5), resistors 8 and 9 having the same resistance value and constituting an inverter together with an amplifier 10, an integration capacitor 11 constituting a Miller integration circuit together with an integration amplifier 12 to send out an output iNT, a comparator 13 for comparing the output iNT of the integration amplifier 12 with a reference voltage Vt, another comparator 14 for comparing the output iNT of the amplifier 12 with a reference voltage Vc, and an amplifier 15 constituting a drive circuit for driving an iRED 16 together with a transistor 17 and a resistor 18. Because a reference voltage Vr is applied to the amplifier 15, a constant current Vr/R18 flows to the iRED 16 (where R18 is the resistance value of a resistor 18). The circuit further includes a capacitor 19, a resistor 20, and a microcomputer 21 receptive of the outputs Pt and Pz from the comparators 13 and 14 for producing outputs A1, A2, iRON, SPL1, SPL2 and ATZ to control the on-and-off operations of analog switches S1-S5 and others. The microcomputer 21 has an internal counter 21$a$.

Figure 2:
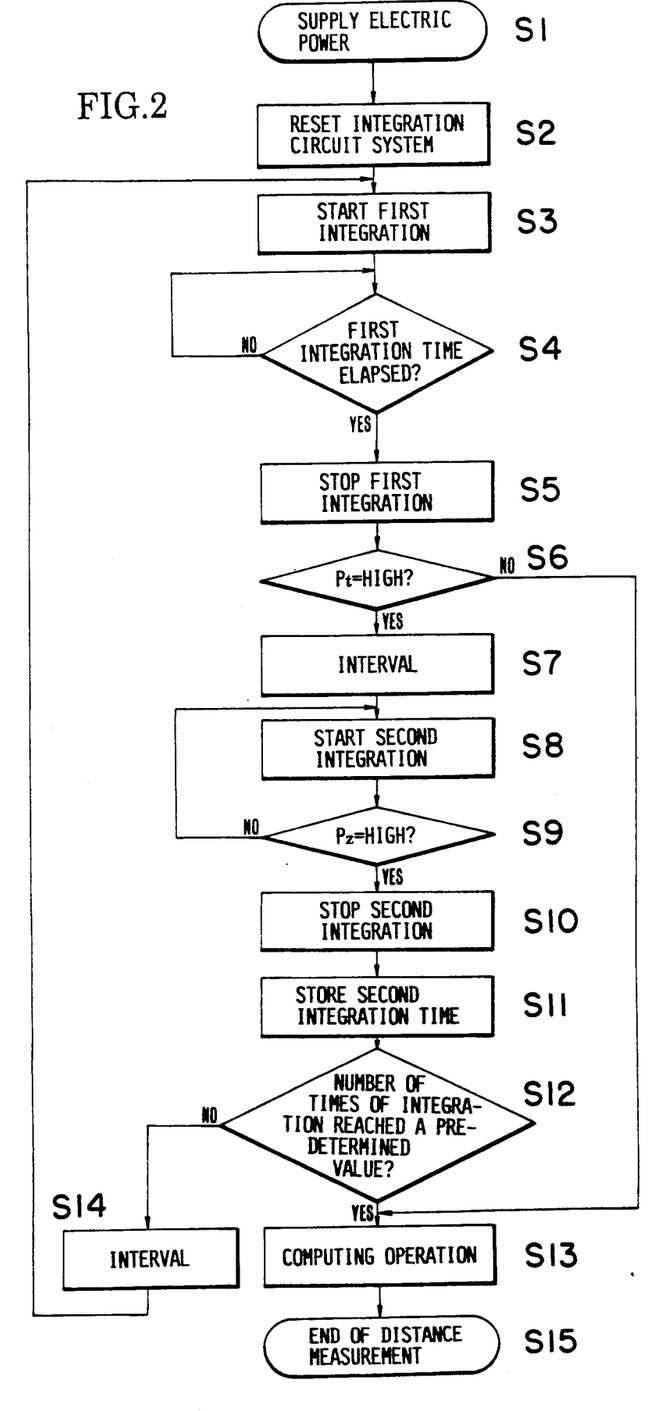
FIG. 2 is a flowchart for the operation of the circuit of FIG. 1.

Next explanation is given by using the flowchart of FIG. 2.

When a shutter button of the camera is pushed down, a circuit (not shown) operates to supply an electric power to each circuit (Step S1—SUPPLY ELECTRIC POWER). The microcomputer 21 first initializes the integration circuit system (Step S2—RESET INTEGRATION CIRCUIT SYSTEM) by changing its outputs SPL1, SPL2 and ATZ to high level. Responsive to this, the analog switches S3, S4 and S5 are turned on. This causes the offset of the integration circuit system to be automatically memorized in the capacitor 19 in order that during the first integration and the second integrations the output iNT of the integration amplifier 12 does not change by other than the signal. Such a measure is similar to the offset canceling which is usually adopted by the A/D converter of the dual slope integration type.

Figure 3:
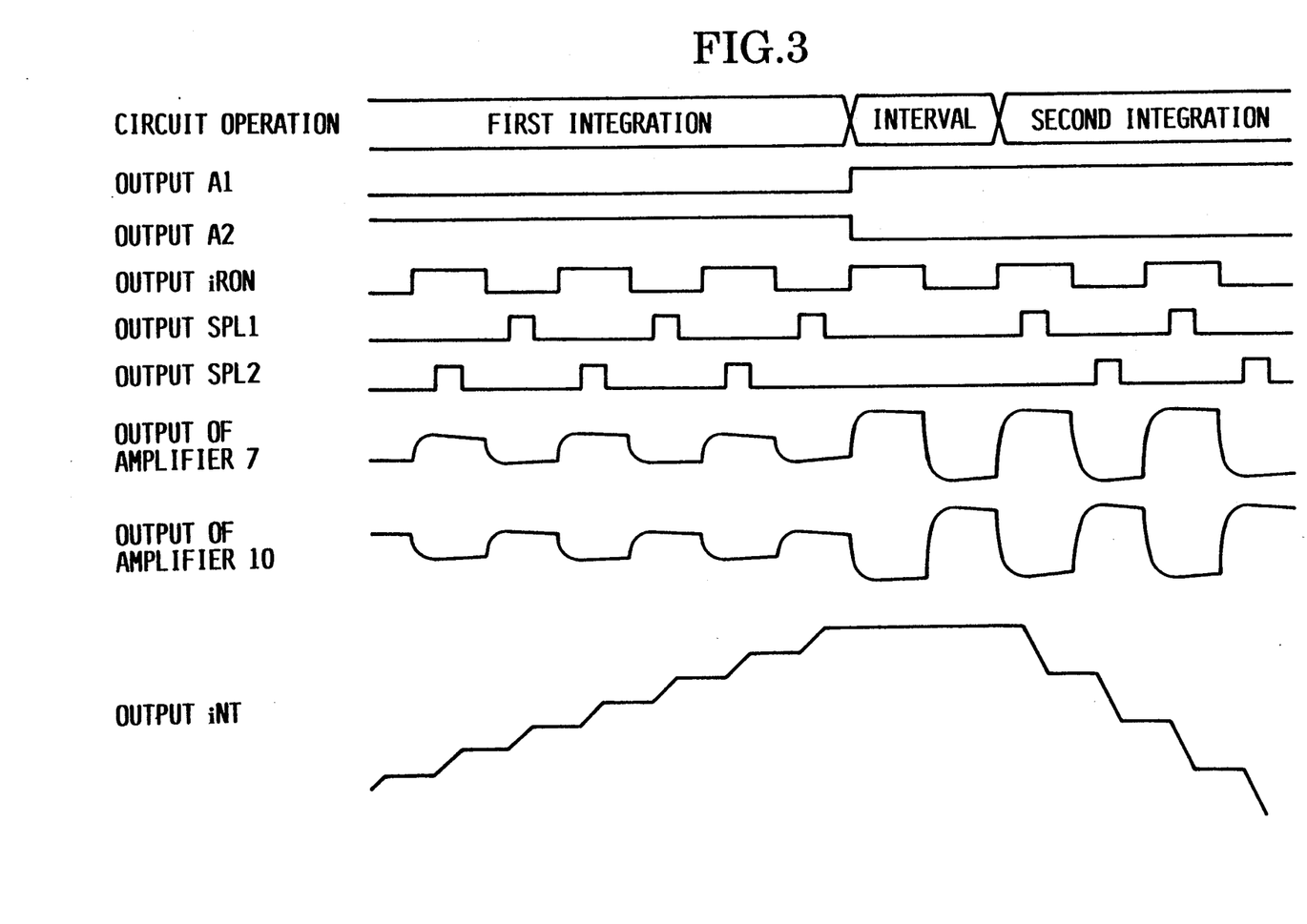
FIG. 3 is a timing chart illustrating the manner in which the circuit of FIG. 1 operates.

As the offset canceling has been carried out for a predetermined period of time, when the integration circuit system becomes stable, the output ATZ is then changed to low level, that is, the analog switch S5 is then turned off. Hence, the first integration starts (Step S3—START FIRST INTEGRATION). In connection with the first integration and those that follow, the manners in which the various portions of the circuit operate are shown in the timing chart of FIG. 3. The first integration is performed on the photocurrent Ia output from the electrode 1a of the PSD 1. At this time, the level of the output A1 is low, that is, the analog switch S1 is in an off state, and the level of the output A2 is high, that is, the analog switch S2 is in an on state. Another output iRON takes either of high and low levels. The phase of lighting-on and -off of the iRED 16 is the same as the phase of output amplitude of the amplifier 7 while it is reverse to the phase of output amplitude of the amplifier 10. Accordingly, when the level of the output iRON is high, that is, when the iRED 16 is lighting on, the output SLP2 is at a high level, that is, the analog switch S4 is in an on state, permitting the output of the amplifier 10 to be integrated. Then, when the level of the output iRON is low, that is, when the iRED 16 is lighting off, the output SPL1 is at a low level, that is, the analog switch S3 is in an on state, permitting the output of the amplifier 7 to be integrated. As a result, the output iNT of the integration amplifier 12 is ever increasing as shown in FIG. 3.

At the elapse of a predetermined period of time T from the start of the first integration (Step S4—FIRST INTEGRATION TIME ELAPSED?), the microcomputer 21 stops the first integration (Step S5—STOP FIRST INTEGRATION) and judges the output Pt of the comparator 13. Here, the fact that the output Pt (Step S6—Pt=High?) is at a high level implies that the output iNT of the integration amplifier 12 has a voltage not lower than the reference voltage Vt. If the output Pt is at a low level, it implies that the output (integration output) iNT does not reach the reference voltage Vt yet. In the case of the low level of the output Pt, the microcomputer 21 judges (Step S13—COMPUTING OPERATION) that the object is beyond a predetermined distance, and stops the distance measuring operation (Step S15—END OF DISTANCE MEASUREMENT OPERATION). This is because the failure of the integration output iNT from reaching the reference voltage Vt results from the fact that the signal is zero or very weak. Such a situation is encountered exclusively when the object is far away. It should be pointed out that as will be understood from the foregoing, the reference voltage Vt is previously set to a value satisfying the above-described condition.

Meanwhile, when the output Pt is at a high level, that is, when the integration output iNT exceeds the reference voltage Vt, the microcomputer 21 then starts to carry out a second integration (Step S8—START SECOND INTEGRATION). For this purpose, it changes its output A1 to a high level, causing the analog switch S1 to be turned on, while changing its output A2 to a low level, causing the analog switch S2 to be turned off. This is because the second integration is performed on the sum of two photocurrents output from the PSD 1. The above-described switching of the analog switches S1 and S2 renders the circuit unstable for a while. Therefore, provision is made of a certain interval time (Step S7—INTERVAL). After the elapse of this interval time, the second integration is started. The manner in which the various portions of the circuit operate during the second integration is also shown in the timing chart of FIG. 3. In the second integration, the sum (Ia+Ib) of both outputs of the PSD 1 is integrated in a direction reverse to that in the first integration. Therefore, the second integration is performed in a timing shown in FIG. 3, conversely to the case of the first integration. When the output iRON is at a high level, that is, when the iRED 16 is lighting on, the output SPL1 is changed to high level, that is, the analog switch S3 is turned on to integrate the output of the amplifier 7. When the output iRON is at a low level, that is, when the iRED 16 is lighting off, the output SPL2 is changed to high level, that is, the analog switch S4 is turned on to integrate the output of the amplifier 10. As a result, the output iNT of the integration amplifier 12 is ever decreasing as shown in FIG. 3. At this time, the microcomputer 21 is counting the second integration time by using the internal counter 21a.

As the comparator 14 watches the output iNT of the integration amplifier 12, when that integration output iNT falls below the reference voltage Vc, the output Pz is changed to high level, being supplied to the microcomputer 21. The microcomputer 21 allows the second integration to continue until the output Pz is changed to high level (Step S9—Pz=HIGH?) and, when the output Pz is changed to high level, stops the second integration (Step S10—STOP SECOND INTEGRATION). As the internal counter 21 has counted the time, its content is memorized as the second integration time (Step S11—STORE SECOND INTEGRATION TIME). Here, a timing relation between the rising edge of the output Pz and the termination of the second integration is shown in FIG. 5.

Figure 5:
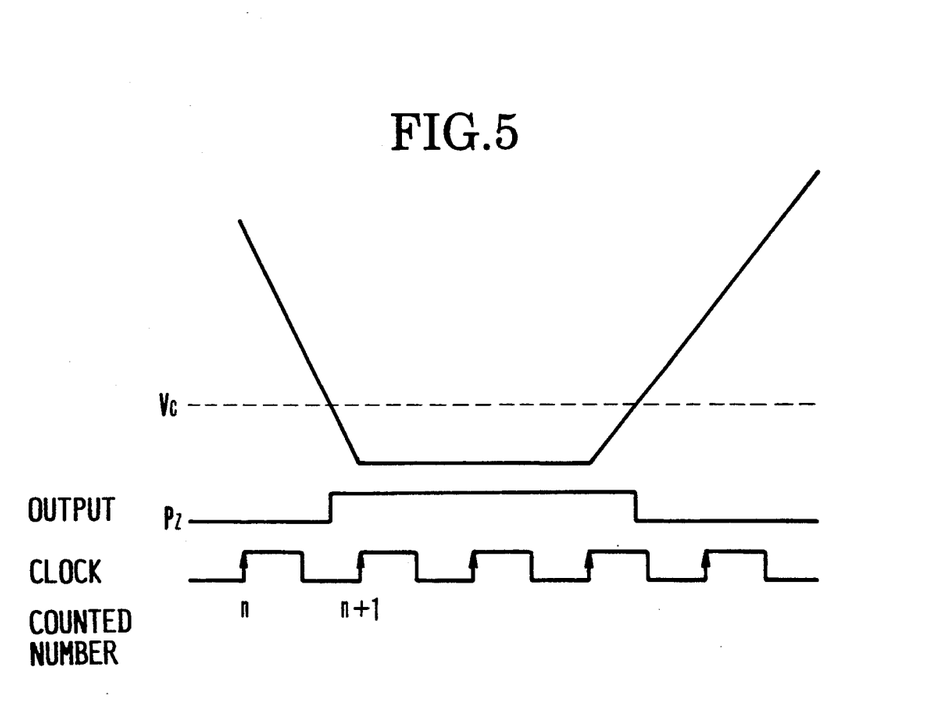
FIG. 5 is a diagram for explaining how to set the termination of the second integration time in the embodiment of FIG. 1.
Figure 6:
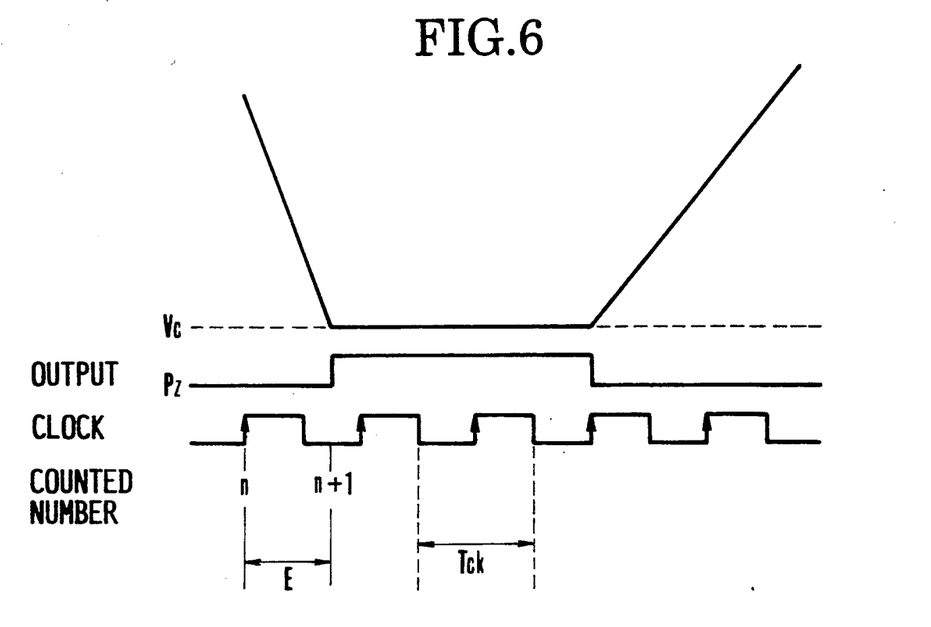
FIG. 6 is a diagram for assisting the explanation of FIG. 5.

In FIG. 5, there are shown the output iNT of the integration amplifier 12, the output Pz of the comparator 14 and the clock pulses with which the internal counter 21a counts the second integration time. The microcomputer 21 stops the second integration at the time of rising of a clock pulse for the internal counter 21a which is first generated after the output Pz is changed to high level, that is, after the output iNT of the integration amplifier 12 falls below the reference voltage Vc. At this time, the counted number becomes (n+1). If the second integration is stopped immediately after the output Pz becomes high level as shown in FIG. 6, the actual integration time would not coincide with the integration time obtained by the internal counter 21a, so that an error of time E is produced. Assuming that a period of the clock is Tck, the error of time E can reach the period Tck at maximum. As the number of times of the first integration and the second integration increases, the errors of time are accumulated to an ever greater amount.

When the second integration is stopped in the above-described timed relationship, the first integration is carried out again from a state of integration obtained at a point of time when the preceding second integration comes to an end. Even in this transition, as has been described above, to avoid influence of the unstableness of the circuit resulting from the switching over between the outputs of the PSD 1, an interval time is put in.

Figure 4:
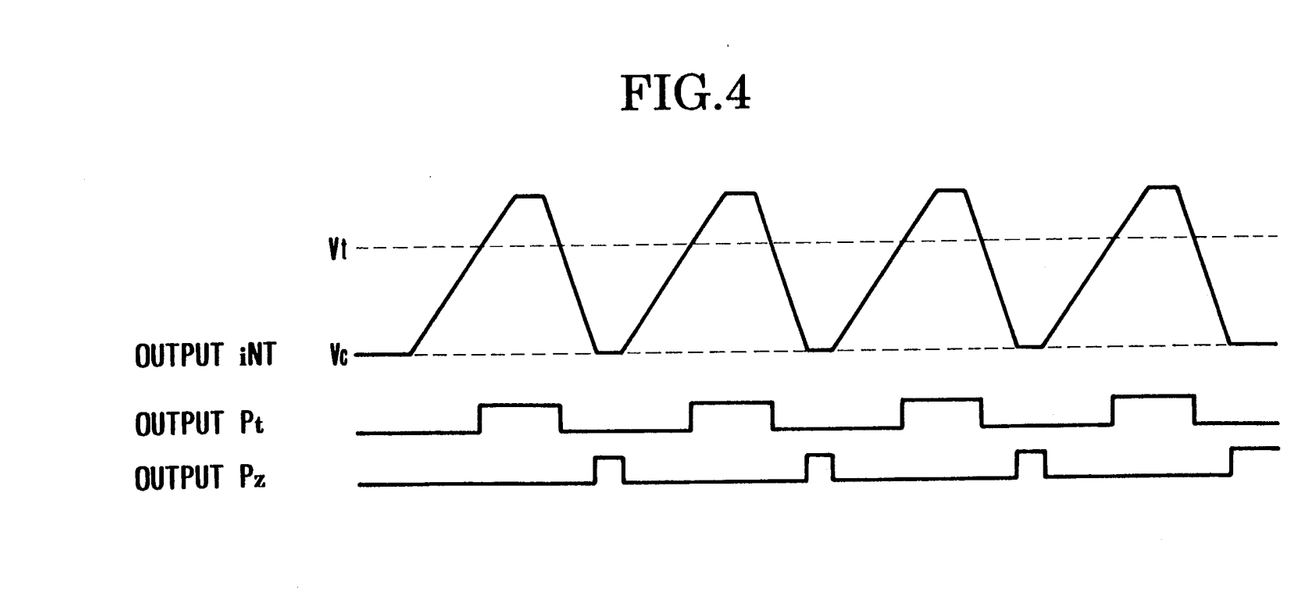
FIG. 4 is a waveform diagram showing the outputs of the integrator of FIG. 1.

In such a manner, the sequence of the first integration and the second integration is performed repeatedly. When the number of times of such integrating operation has reached a predetermined value (Step S12—NUMBER OF TIMES OF INTEGRATION REACHED A PREDETERMINED VALUE?), the sequence of integrating operation is stopped. Then, based on the total sum of the second integration times over all the sequence of integrating operation, the distance to an object is computed (Step S13—COMPUTING OPERATION) by the above-described method known in the art. Taking an example of four times of integrating operation, the distance measurement is carried out with the results of the integration output iNT and the outputs Pt and Pz of the comparators 13 and 14 described above in the wave forms shown in FIG. 4.

It should be noted that since the counting of the last second integration time is stopped at a point of time when the output Pz is changed to high level, the possible maximum error here is Tck.

Figure 7:
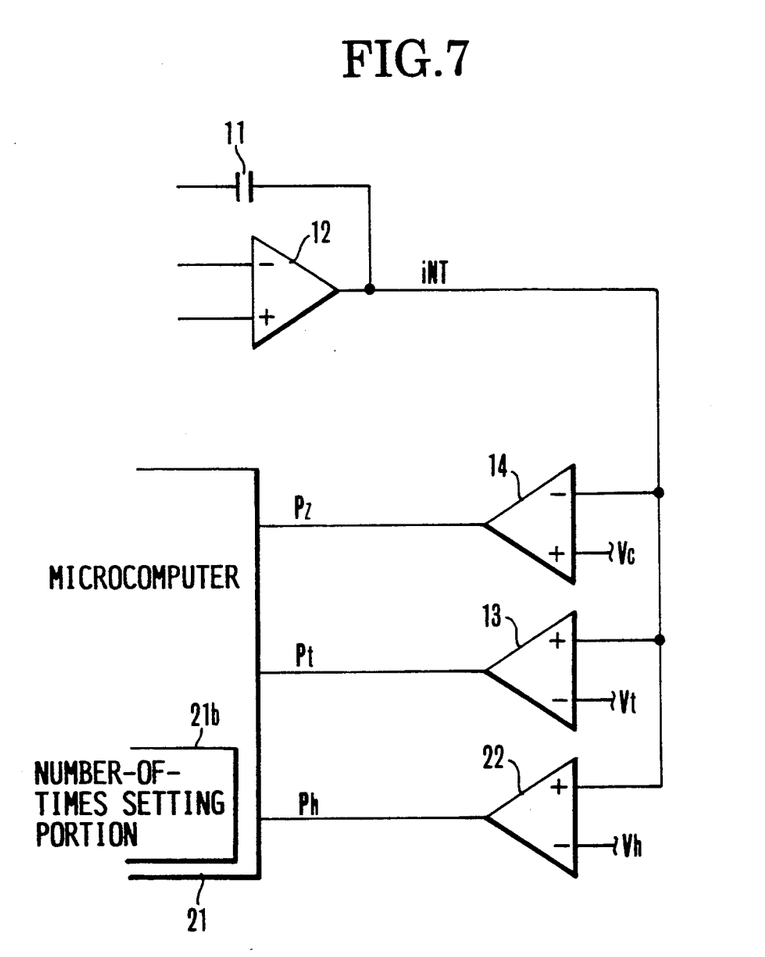
FIG. 7 is a block diagram illustrating another embodiment of the invention.

FIG. 7 in block diagram shows the main parts of another embodiment of the invention, wherein the same parts to those of the FIG. 1 embodiment are denoted by the same reference characters. What is different from the foregoing embodiment is as follows: In a constructional feature, there is provided a comparator 22 whose reference voltage Vh for comparison with the output iNT of the integration amplifier 12 is set to a value higher than the above-described reference voltage Vt and whose output Ph is sent out to the microcomputer 21, and a number-of-times setting portion 21b is newly provided within the microcomputer 21. In an operational principle, after the integrating operation at the first time has ended, the number of times of integration to be performed is made to be varied depending on the level of the output iNT of the integration amplifier 12.

When the first integration at the first time has ended with the output iNT of the integration amplifier 12 at a level not lower than the reference voltage Vh, that is, when an output Ph of the comparator 22 is at a high level, as it implies that the signal is so strong that shortening of the integration time does not deteriorate the S/N ratio, the number-of-times setting portion 21b reduces the number of times of integration to be performed. When the output iNT of the integration amplifier 12 has a voltage lower than the reference voltage Vh and not lower than the reference voltage Vt, that is, when the level of the output Ph is low and the level of the output Pt is high, the number-of-times setting portion 21b permits the predetermined number of times of integration described above to be performed. When the integration output iNT has a voltage lower than the reference voltage Vt, that is, when the level of the output Pt is low, the microcomputer 21 judges the object to be at infinity and immediately stops the distance measuring operation.

It should be noted that in the above-described other embodiment, the output iNT of the integration amplifier 12 may otherwise be made to be compared with another reference voltage $V_L$ set to a value lower than the above-described reference voltage Vt, so that when the level of the output iNT of the integration amplifier 12 lies between the reference voltage Vt and the reference voltage $V_L$, the number of times of integration to be performed is increased from the above-described predetermined value to improve the S/N ratio.

Also, although, in the above-described other embodiment, determination of the number of times of integration to be performed is made by judging the first integration output at the first time, this judgment may otherwise be effected at any time in the initial stage other than the first time.

Further, although, in the foregoing embodiments, the first and second integration times are shortened and this sequence is repeated a plural number of times, the invention is not confined thereto. The first integration and the second integration may be carried out for an ordinary length of time to be repeated a plural number of times. Even in this case, although as good results as when the first and second integration times are shortened cannot be expected, at least an improvement in the accuracy of distance measurement over the prior art can be achieved.

Again, although in the foregoing embodiments with the distance measuring signal use is made of the spot light, this may be in any other form. Even in this case, it is needless to say that the present invention is applicable.

As has been described above, according to each of the above-described embodiments, the first integration and the second integration are shortened in time and are repeated a plural number of times. Therefore, the integration time per one time becomes so short that the camera shake or the lowering of the power of light emission due to the increase of the temperature of the iRED 16 does not bring about a change of the signal during the integration, thus making it possible to minimize the error of distance measurement. Another advantage arising from the preservation of the total integration time at the long value is that an improvement in the S/N ratio can be expected. All in all, it is made possible to realize a distance measurement with higher accuracy than ever before.

Also, according to each of the above-described embodiments, the termination of the second integration is made to be synchronized with the clock that is used to count the second integration time. Therefore, without having to increase the resolving power in time by speeding up the clock, the error of time measurement is reduced. This produces an advantage that a fewer number of figures suffice for the internal counter for counting the second integration time, or when the counting is carried out on the program of the microcomputer 21, a fewer number of data bits are sufficient.

Further, according to the above-described other embodiment, the number of times of integration to be performed is made to be varied depending on whether or not the the first integration output at the first time has a voltage higher than a predetermined voltage. If the first integration output in the initial stage is high, it is possible to shorten the time of distance measurement. If it is low, it is possible to improve the S/N ratio.

What is claimed is:

1. A distance measuring device for measuring a distance from a given location to an object in accordance with a receiving position at which a reflected signal obtained by projecting a signal onto the object is received, in which a ratio between plural outputs of a signal receiving means for receiving the reflected signal varies according to the receiving position for the reflected signal, and in which said ratio is obtained from the ratio of a period of time required for a first integration to a period of time required for a second integration, which is an inverse integration of said first integration, of outputs of said signal receiving means to detect the receiving position, said distance measuring device comprising:
- (A) integration means for performing an integrating operation including the first integration and the second integration;
- (B) control means providing control input to said integration means for causing said integration means to perform the integrating operation including the first integration and the second integration repeatedly a predetermined plural number of times; and
- (C) computing means for receiving input from said integration means for obtaining the receiving position from the ratio of periods of times required for the first integration and the second integration when said integration means has performed the integrating operation said predetermined plural number of times.

2. The device according to claim 1, further comprising:
determining means in said computing means for judging an integration state of said integrating means in an initial stage of said plural number of times of the integrating operation, said determining means for judging an integration state determining said plural number of times the integrating operation is to be performed.

3. The device according to claim 2, wherein said determining means includes judgment means for judging an integration level of said integrating means.

4. The device according to claim 3, wherein said determining means includes means for reducing said plural number of times the integrating operation is to be performed when the integration level judged by said judgment means is greater than a predetermined value.

5. The device according to claim 2, wherein said determining means includes means for judging the integration state of said integration means with regard to the first integration performed at said initial stage of said plural number of times of the integration operation.

6. The device according to claim 1, further comprising complementing means in said computing means for conceling a fraction produced by every one integrating operation of said plural number of times of the integrating operation by a subsequent integrating operation of said plural number of times of the integrating operation.

7. The device according to claim 1, wherein said projected signal includes light.

8. A device for determining a varying output ratio of light receiving means which receives light reflected by an object and varies its output ratio in accordance with its light receiving condition from a ratio of a times required for a first integration of the output of said light receiving means to a time required for a second integration of said output, which is an inverse integration of said first integration, said device comprising:
- (A) integration means for performing an integrating operation including the first integration and the second integration;
- (B) control means providing control input to said integration means for causing said integration means to perform the integrating operation including the first integration and the second integration repeatedly a predetermined plural number of times; and
- (C) computing means for receiving input from said integration means for obtaining a ratio of the output of said light receiving means from the ratio of periods of times required for the first integration and the second integration when said integration means has performed the integrating operation said predetermined plural number of times.

9. The device according to claim 8, further comprising: determining means in said computing means for judging an integration state of said integrating means in an initial stage of said plural number of times of the integrating operation, said determining means for judging an integration state determining said plural number of times the integrating operation is to be performed.

10. The device according to claim 9, wherein said determining means includes judgment means for judging an integration level of said integrating means.

11. The device according to claim 10, wherein said determining means includes means for reducing said plural number of times the integrating operation is to be performed when the integration level judged by said judgment means is greater than a predetermined value.

12. The device according to claim 9, wherein said determining means includes means for judging the integration state of said integration means with regard to the first integration performed at said initial stage of said plural number of times of the integration operation.

13. The device according to claim 8, further comprising complementing means in said computing means for canceling a fraction produced by every one integrating operation of said plural number of times of the integrating operation by a subsequent integrating operation of said plural number of times of the integrating operation.

14. A camera having a device for measuring a distance from a given location to an object in accordance with a receiving position at which a reflected signal obtained by projecting a signal onto the object is received, in which a ratio between plural outputs of a signal receiving means for receiving the reflected signal varies according to the receiving position for the reflected signal, and in which said ratio is obtained from the ratio of a period of time required for a first integration to a period of time required for a second integration, which is an inverse integration of said first integration, of outputs of said signal receiving means to detect the receiving position, said distance measuring device comprising:
- (A) integration means for performing an integrating operation including the first integration and the second integration;
- (B) control means providing control input to said integration means for causing said integration means to perform the integrating operation including the first integration and the second integration repeatedly a predetermined plural number of times; and
- (C) computing means for receiving input from said integration means for obtaining the receiving position from the ratio of periods of time required for the first integration and the second integration when said integration means has performed the integrating operation said predetermined plural number of times.

15. The camera according to claim 14, further comprising: determining means in said computing means for judging an integration state of said integrating means in an initial stage of said plural number of times of the integrating operation, said determining means for judging an integration state determining said plural number of times the integrating operation is to be performed.

16. The camera according to claim 15, wherein said determining means includes judgment means for judging an integration level of said integrating means.

17. The camera according to claim 16, wherein said determining means includes means for reducing said plural number of times the integrating operation is to be performed when the integration level judged by said judgment means is greater than a predetermined value.

18. The camera according to claim 15, wherein said determining means includes means for judging the integration state of said integration means with regard to the first integration performed at said initial stage of said plural number of times of the integration operation.

19. The camera according to claim 14, further comprising complementing means in said computing means for canceling a fraction produced by every one integrating operation of said plural number of times of the integrating operation by a subsequent integrating operation of said plural number of times of the integrating operation.

20. The camera according to claim 14, wherein said projected signal includes light.

21. A camera having a device for determining a varying output ratio of light receiving means which receives light reflected by an object and varies its output ratio in accordance with its light receiving condition from a ratio of a time required for a first integration of the output of said light receiving means to a time required for a second integration of said output, which is an inverse integration of said first integration, said device comprising:
(A) integration means for performing an integrating operation including the first integration and the second integration;
(B) control means providing control input to said integration means for causing said integration means to perform the integrating operation including the first integration and the second integration repeatedly a predetermined plural number of times; and
(C) computing means for receiving input from said integration means for obtaining a ratio of the output of said light receiving means from the ratio of periods of time required for the first integration and the second integration when said integration means has performed the integrating operation said predetermined plural number of times.

22. The camera according to claim 21, further comprising: determining means in said computing means for judging an integration state of said integrating means in an initial stage of said plural number of times of the integrating operation, said determining means for judging an integration state determining said plural number of times the integrating operation is to be performed.

23. The camera according to claim 22, wherein said determining means includes judgment means for judging an integration level of said integrating means.

24. The camera according to claim 23, wherein said determining means includes means for reducing said plural number of times the integrating operation is to be performed when the integration level judged by said judgment means is greater than a predetermined value.

25. The camera according to claim 22, wherein said determining means includes means for judging the integration state of said integration means with regard to the first integration performed at said initial stage of said plural number of times of the integration operation.

26. The camera according to claim 21, further comprising complementing means in said computing means for canceling a fraction produced by every one integrating operation of said plural number of times of the integrating operation by a subsequent integrating operation of said plural number of times of the integrating operation.

* * * * *